United States Patent

Ward

[15] 3,699,209

[45] Oct. 17, 1972

[54] HF REMOVAL SYSTEM
[72] Inventor: Dennis J. Ward, South Barrington, Ill.
[73] Assignee: Universal Oil Products Company, Des Plaines, Ill.
[22] Filed: Feb. 26, 1971
[21] Appl. No.: 119,404

[52] U.S. Cl. .................423/240, 423/483, 423/489, 260/683.41
[51] Int. Cl. .............................................B01d 53/34
[58] Field of Search ....................423/2 R, 4, 153, 88; 260/683.41

[56] References Cited

UNITED STATES PATENTS 2,686,151 8/1954 Feldbauer et al......423/153 X
2,813,000 11/1957 Quittenton.................423/2 R Primary Examiner—Earl C. Thomas
Attorney—James R. Hoatson, Jr. and Edward W. Remus

[57] ABSTRACT

In scrubbing systems wherein HF contained in gaseous steams is removed by scrubbing with an aqueous calcium hydroxide system, corrosion is diminished by the addition of up to about 3 percent by weight of an alkali metal hydroxide.

10 Claims, No Drawings

HF REMOVAL SYSTEM

BACKGROUND OF THE INVENTION

The present invention pertains to the removal of hydrogen fluoride from gaseous streams by scrubbing with an aqueous calcium hydroxide system. More particularly, the present invention pertains to an improvement in a calcium hydroxide scrubbing system for the removal of hydrogen fluoride from a gas stream wherein undesired amounts of corrosion occur.

The removal of hydrogen fluoride from gaseous streams by scrubbing with an aqueous calcium hydroxide system (i.e., lime water) is well known to those trained in the art. In this scrubbing operation, hydrogen fluoride or a hydrogen fluoride containing gas stream is contacted with an aqueous solution or suspension of calcium hydroxide. In the neutralization reaction that follows between the calcium hydroxide and hydrogen fluoride, relatively insoluble calcium fluoride is formed which is readily removed from the scrubbing system. Alkali metal bases are not generally utilized in a single stage system since the resultant salt is water soluble and would be a source of water pollution. Therefore, calcium hydroxide is used since it forms an insoluble salt upon reaction. A particularly preferred mode of operation involves the countercurrent contact of an upflowing gaseous stream containing hydrogen fluoride with a downflowing liquid stream comprising an aqueous suspension of solid, finely divided calcium hydroxide. While this contacting can be effected in a gas-liquid contacting zone containing an inert packing means such as Berl saddles or Raschig rings, a particularly preferred operation utilizes a plurality of metal contacting plates to obtain efficient vapor-liquid contacting.

This removal of hydrogen fluoride from gaseous streams is particularly important if the gas stream is to be ultimately discharged to the atmosphere. For example, in commercially operating plants for the alkylation of isoparaffins or aromatic hydrocarbons with olefins, there is provided a relief gas system which recovers any hydrogen fluoride inadvertently expelled from various points in the process. This system comprises a central piping system where the pressure relief valve on the hydrogen fluoride storage tank and other sources discharge released hydrogen fluoride. This system is constantly purged with an inert carrier gas stream such as a sweet and dry natural gas stream to carry the hydrogen fluoride to the calcium hydroxide gas scrubbing system to remove the hydrogen fluoride and avoid air pollution if other wise discharged.

Frequently, in commercial relief gas systems such as utilized in hydrogen fluoride catalyzed alkylation units, large amounts of hydrogen fluoride are rapidly released to the calcium hydroxide system. While the typical system is well designed and able to completely remove the hydrogen fluoride during these surge periods, so as to render a gaseous stream free of any hydrogen fluoride, some hydrogen fluoride is entrained in the system, usually in "dead spots" beneath the vapor liquid contacting plate, for considerable periods of time before it is neutralized by the calcium hydroxide. Further, during these peak periods, the solution, despite being an effective scrubbing medium, becomes acidic. This time lag before complete neutralization usually is the result of insufficient amounts of calcium hydroxide being present because of the low solubility of calcium hydroxide in water and/or the relative inaccessibility of the calcium hydroxide solution to the trapped amounts of hydrogen fluoride. Despite the utilization of highly corrosive resistant metal alloys in the scrubbing system, the hydrogen fluoride, when free in an aqueous environment for prolonged periods inevitably results in corrosion problems in the unit, particularly in the described "dead spots." Accordingly, the art seeks methods of eliminating the corrosion in these units without resort to expensive exotic alloys.

SUMMARY OF THE INVENTION

It is an object of this invention to provide an improved method for removing hydrogen fluoride from gaseous streams when utilizing an aqueous calcium hydroxide scrubbing system.

It is a particular object of this invention to provide a method for eliminating corrosion in aqueous calcium hydroxide systems utilized for scrubbing hydrogen fluoride from gaseous streams.

This corrosion can be diminished, if not substantially eliminated, by the addition of about 3 percent by weight alkali metal hydroxide to the calcium hydroxide system. Preferably, about 0.5 percent to about 1 percent by weight alkali metal hydroxide is added. In an embodiment, therefore, the present invention relates to an improvement in a process for the removal of hydrogen fluoride from a hydrogen fluoride containing gaseous stream by scrubbing the gas stream in a scrubbing section with an aqueous scrubbing medium containing calcium hydroxide wherein acid induced corrosion is present in the scrubbing section. The particular improvement which diminishes the corrosion in the scrubbing section, comprises effecting the scrubbing with an aqueous calcium hydroxide scrubbing medium containing up to about 3 percent by weight alkali metal hydroxide. Preferred are potassium or sodium hydroxide in amounts sufficient to result in a scrubbing medium containing about 0.5 percent to 1 percent by weight potassium or sodium hydroxide.

Other objects, embodiments and a more detailed description of the foregoing embodiments may be found in the following more detailed description of this invention.

DETAILED DESCRIPTION OF THE INVENTION

As indicated, the removal of hydrogen fluoride, as a broad concept, from a hydrogen fluoride containing gaseous stream by means of calcium hydroxide scrubbing is well known to those trained in the art. Therefore, for sake of brevity, the discussion of the present invention will be limited to a relief gas scrubber contained in conventional hydrogen fluoride catalyzed alkylation processes. In this system, hydrogen fluoride, as released as relief material from various sources within the process and, typically in admixture with a natural gas carrier material, is passed to a relief gas scrubber. In addition, this relief gas stream may contain other inert carrier gases such as nitrogen and some light hydrocarbons including ethane, propane, butane, isobutane, butylenes and isobutylene. This relief gas scrubber is typically comprised of a conventional countercurrent vapor-liquid contacting column having a lower gas inlet port in the lower locus of the column and an upper scrubbing liquid port in the upper locus of the column. Intermediate to these entry ports are a series of inwardly and downwardly orientated vapor-liquid contacting trays. As the calcium hydroxide scrubbing solution (also referred to in the art as lime water) enters the upper port, it is contacted with the uprising vapors so as to produce a hydrogen fluoride-free gas stream which is passed to the refinery flare. In the lowermost portion of the column, a relatively constant liquid level is maintained which is air agitated. Withdrawn from this lowermost level is a suspension of the solid calcium fluoride produced in the column which is passed to a neutralization basin. The liquid associated with the calcium fluoride is, insofar as fluoride content is concerned, safe for human consumption — i.e., about 0.5 ppm fluoride. Also withdrawn from a point above the constant liquid level is the unspent lime water which is recirculated with addition of fresh lime water as needed.

As discussed previously, when large amounts of hydrogen fluorides are inadvertently released, such as when the pressure in the hydrogen fluoride storage vessel suddenly rises to a point where the relief valve pops and stays open for more than a few moments, some amounts of hydrogen fluoride are entrapped or entrained in the scrubbing column, particularly in the "dead spots" beneath the vapor-liquid contacting trays. Further, the scrubbing medium becomes acidic for a period of time. No hydrogen fluoride is passed out of the treated gas stream however, since the system design accommodates these peak periods of flow.

Since the solubility of calcium hydroxide in water is relatively low, relatively large amounts of lime water solution (or suspension) are necessary, despite the dibasic nature of the calcium hydroxide, to neutralize the hydrogen fluoride trapped in the "dead spots" of the scrubbing column. Some amounts of solution are always present and circulated in these dead spots, but they do not effectively neutralize the hydrogen fluoride before some corrosion takes place, particularly if the solution is already acidic in nature. As the peak, surge cycles are repeated, the corrosion cycle repeats itself and ultimately, for example, the vapor-liquid contacting trays must be replaced.

This corrosion problem can be diminished, if not substantially eliminated, by the addition of an alkali metal material to the calcium hydroxide scrubbing solution in an amount sufficient to provide an aqueous calcium hydroxide medium containing up to about 3% by weight alkali metal hydroxide. This alkali metal hydroxide containing lime water scrubbing medium, when utilized in conventional relief gas scrubbers will help alleviate corrosion problems in the scrubbing column particularly in the dead spots beneath the vapor-liquid contacting trays.

The alkali metal base material to be added to form the hydroxide in solution may comprise the elemental alkali metal and/or an alkali metal oxide. However, for interest of safety and economics, it is preferred to simply add the alkali metal hydroxide to the lime water solution in the necessary amounts either as a solid or as a concentrated aqueous solution. Preferred alkali metal hydroxides are potassium hydroxide and sodium hydroxide, particularly in amounts of about 0.5 percent to about 1 percent by weight in the final lime water solution.

The utilization of this amount of alkali metal hydroxide, albeit a seemingly small quantity, helps alleviate the corrosion problem in relief gas scrubbers utilized in hydrogen fluoride catalyzed alkylation units. This results since the amount specified is entirely in solution because of its high solubility in water. As a consequence, even under the "surge" conditions hereinbefore described, there is sufficient basic material in solution to help prevent the formation of an acidic solution within the scrubbing column, and even should one form, it is of short duration. In some instances, the alkali metal hydroxide present could even enable a lower lime content (as suspended solids) if the lime system circulated a suspension of calcium hydroxide. In addition, this amount of alkali metal hydroxide is sufficient to neutralize the hydrogen fluoride contained in the "dead spots" within the scrubber in relatively short times so as to diminish the propensity for acid corrosion at these locations.

Even further, the utilization of the prescribed amounts of alkali metal base provides a spent aqueous solution, after solids (i.e., calcium fluoride) removal, having a fluoride level below that recommended by the Public Health Service as causing bone changes (8–20 ppm) if, by any chance, the spent solution was utilized without dilution (other purification assumed) as a drinking water source. In particular, when utilizing sodium hydroxide or potassium hydroxide in about a 0.5 to about 1 percent, by weight concentration range, results in a spent solution, after solids removal containing the optimum amount of fluoride (about 1 to 3 ppm) required for preventing dental caries.

ILLUSTRATIVE EMBODIMENT

A lime water relief gas scrubber contained in an HF motor fuel alkylation unit was operated for nine months before the metal contacting trays, manufactured of carbon steel, required replacement. After the trays were replaced with the same material of construction, about 0.8 percent potassium hydroxide was added and maintained in the circulating lime water solution. After operating for the same time period of nine months at essentially the same conditions as before, including the discharge of large amounts of hydrogen fluoride at relatively the same frequency, the metal contacting trays will exhibit little if any evidence of corrosion.

I claim as my invention:

1. In a process for the removal of hydrogen fluoride from a hydrogen fluoride containing gaseous stream by scrubbing said stream in a scrubbing section with an aqueous scrubbing medium containing calcium hydroxide wherein acid induced corrosion is present in said scrubbing section, the improvement which comprises effecting said scrubbing with an aqueous calcium hydroxide scrubbing medium containing up to about 3 percent by weight alkali metal hydroxide whereby the corrosion in said scrubbing section is diminished.

2. The improvement of claim 1 wherein said scrubbing medium comprises an aqueous suspension of calcium hydroxide.

3. The improvement of claim 1 wherein said alkali metal hydroxide is potassium hydroxide.

4. The improvement of claim 1 wherein said alkali metal hydroxide is sodium hydroxide.

5. The improvement of claim 1 wherein said scrubbing medium contains about 0.5 to about 1 percent, by weight, alkali metal hydroxide.

6. The improvement of claim 5 wherein said hydroxide is potassium hydroxide.

7. The improvement of claim 5 wherein said hydroxide is sodium hydroxide.

8. The improvement of claim 1 wherein said hydrogen fluoride containing gaseous stream comprises a relief gas stream from a hydrogen fluoride catalyzed alkylation unit.

9. The improvement of claim 8 wherein said hydrogen fluoride stream contains light hydrocarbons.

10. The improvement of claim 8 wherein said hydrogen fluoride stream comprises hydrogen fluoride in admixture with an inert gas carrier.

* * * * *